Sept. 10, 1935.  F. V. WALTZ  2,013,934
WEIGHING SCALE
Filed Jan. 5, 1933    2 Sheets—Sheet 1
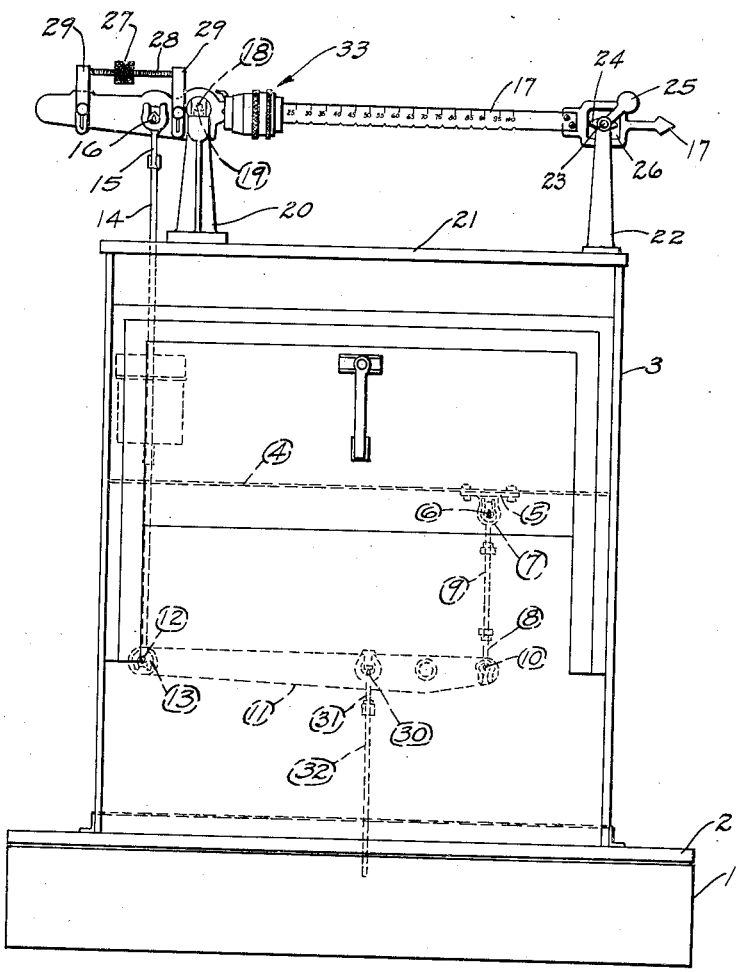
Fig-I
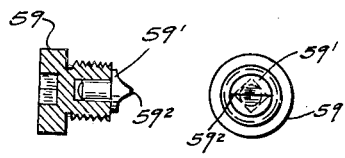
Fig. X  Fig XI
Foster V. Waltz
INVENTOR.
BY Marshall
ATTORNEY.

Sept. 10, 1935.  F. V. WALTZ  2,013,934
WEIGHING SCALE
Filed Jan. 5, 1933  2 Sheets-Sheet 2
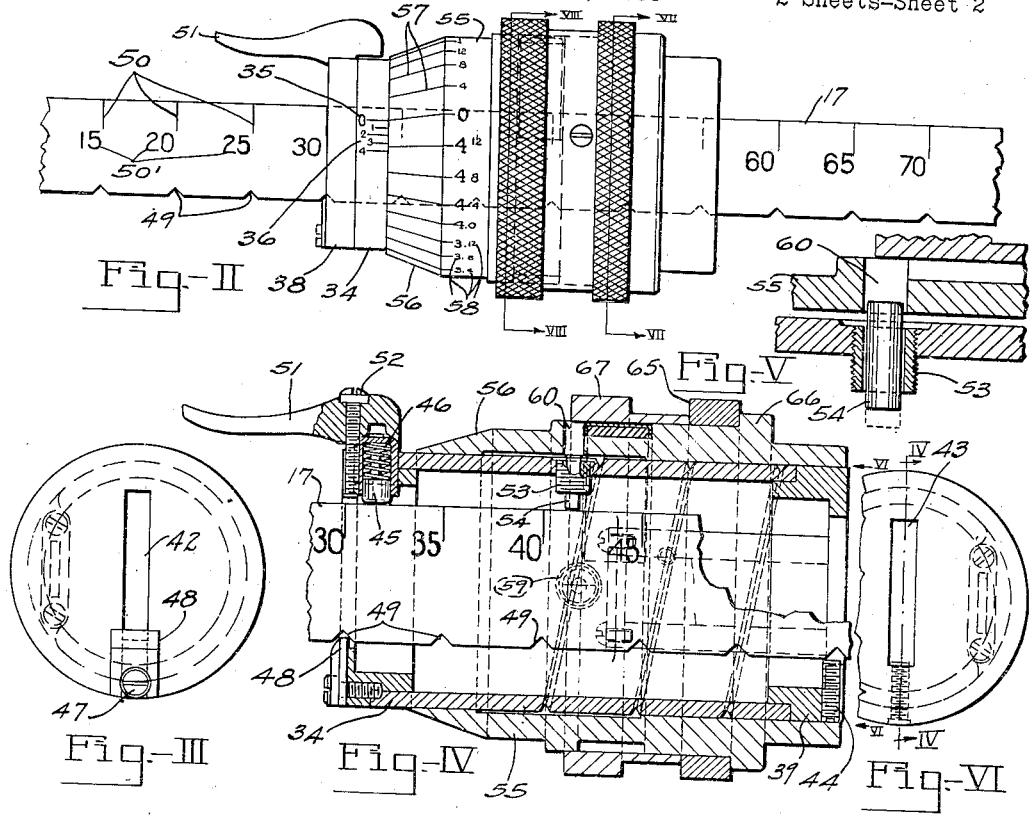
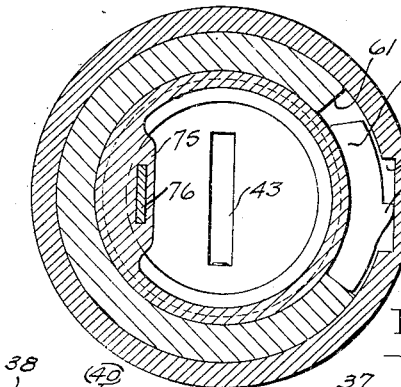
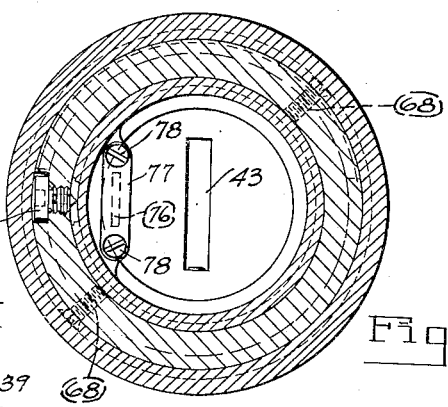
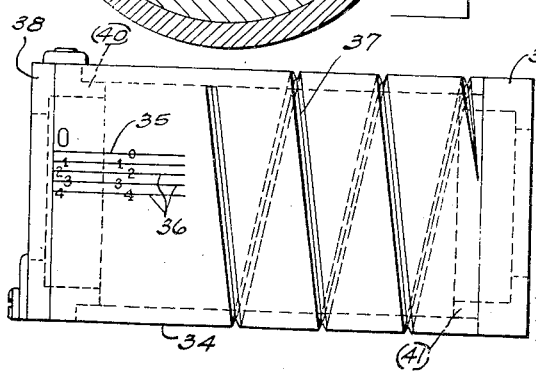
Foster V. Waltz
INVENTOR.
BY *C M Marshall*
ATTORNEY.

Patented Sept. 10, 1935

2,013,934

UNITED STATES PATENT OFFICE 2,013,934

WEIGHING SCALE

Foster V. Waltz, St. Louis, Mo., assignor to Toledo Scale Manufacturing Company, Toledo, Ohio, a corporation of New Jersey Application January 5, 1933, Serial No. 650,271

5 Claims. (Cl. 265—49)

This invention relates generally to weighing scales and particularly to weighing scales which utilize a graduated beam and a poise movably situated thereon to counterbalance at least a portion of the total load; and has for its principal object the provision of improved means whereby the weight of comparatively heavy loads may be determined to relatively small increments.

A further object of the invention is a provision of improved means which permit the utilization of a large number of weight divisions when a beam of comparatively short length is employed.

Another object is the provision of improved means, in a scale poise, which eliminate errors due to accidental displacement of such poise on a scale beam.

A still further object is the provision of means for securely locking a poise, of the type hereinafter described, to a scale beam.

A still further object of my invention is the provision of improved, simple means for adjusting the mass of a poise of the type described.

These and other objects and advantages will be apparent from the following description in which reference is had to the accompanying drawings illustrating a preferred embodiment of my invention and wherein similar reference numerals designate similar parts throughout the several views.

In the drawings:

Figure I is a front elevational view of a scale embodying my invention.

Figure II is a front elevational view of a scale poise embodying my invention and of a fragmentary portion of a suitable scale beam.

Figure III is an end view of the poise showing in detail the position of the locating pawl.

Figure IV is a longitudinal cross section substantially along the line IV—IV of Figure VI.

Figure V is a fragmentary enlarged view of one of the locking means of the poise.

Figure VI is a fragmentary end elevation seen substantially along the line VI—VI of Figure IV.

Figure VII is a cross section through the poise substantially along the line VII—VII of Figure II.

Figure VIII is a cross section through the poise substantially along the line VIII—VIII of Figure II.

Figure IX is a side elevational view of the body portion of the poise, showing in detail the arrangement of indicia and spiral groove.

Figure X is an enlarged side elevational view, a part in section, of a screw and a chisel pointed member adapted to engage the V-thread; and Figure XI is an end elevational view thereof.

Since the type of scale depicted is shown solely for the purpose of generally illustrating the application of a poise built according to my invention, and per se forms no part thereof, it is described hereinafter only for the purpose of fully disclosing my invention.

Referring to the drawings in detail the scale comprises a base 1 which is preferably a rigid construction fabricated from architectural steel and serves to support and house the load supporting lever system, (not shown). This load supporting lever system which may be of any preferred type supports a load receiving platform 2. One end of the base is provided with a stationary deck portion, lying substantially in the plane of the platform 2 and has mounted thereon a cabinet 3 which is divided into two portions by a shelf 4. A fulcrum bracket 5 provided with a knife edge pivot 6 is secured to the under side of the shelf 4. This pivot engages a stirrup 7 secured to the upper end of a connecting rod 9, the lower end of which, being also provided with a stirrup 8, engages a pivot 10 projecting through the end of a lever 11. The opposite end of this lever is provided with a pivot 12 which engages a suitable bearing in a stirrup 13 and is connected by a relatively long connecting rod 14 to the stirrup 15, a bearing of which engages a load pivot 16 of the counterbalancing beam 17. A fulcrum pivot 18 which projects through a portion of the beam which has substantial thickness, oscillably supports the beam upon bearings 19 which are adjustably seated in a fulcrum bracket 20 bolted to a cabinet top 21 surmounting the cabinet. The opposite end of the cabinet top is also provided with an upwardly extending bracket 22 which forms a part of a "trig-loop" to lock the beam when the scale is not used. This "trig-loop" construction comprises a rotatable shaft 23 extending through the bracket 22 having a latch 24 pinned adjacent to one end. The other end of the shaft on the opposite side of the bracket is provided with a handle 25 by which the latch may be turned into a locking position within a rectangular opening 26 in the beam 17. For the purpose of statically balancing the beam 17 and such parts that are secured thereto, I have provided a balance weight 27 which is longitudinally adjustable upon a threaded rod 28, the ends of this rod are supported by two brackets 29 which are secured to the beam 17 in such a manner that they may be adjusted perpendicularly. Since the method for statically balancing a scale beam is so widely known, I will not describe it in greater detail. To connect the counterbalancing mechanism hereinbefore described to the load supporting lever and platform, the lever 11 is provided with a pivot 30 stationed at the proper distance from the fulcrum pivot 10 and is engaged by a stirrup 31 provided with a downwardly extending rod 32, the lower end of which (not shown) engages the nose pivot of the load supporting lever system.

A load placed on the platform, due to the action of gravity, exerts a force which is transmitted through the different levers and connecting rods to the load pivot 16 fixed in the counterbalancing beam 17, on one side of the fulcrum pivot 18. The portion of the beam 17 on the other side of the fulcrum shaft 18 is in the form of a graduated rectangular bar upon which a poise 33 may be stationed at different distances from the fulcrum pivot to counterbalance loads of different magnitude. For the sake of simplicity, it is desirable that scales of the type herein described be equipped with a single counterbalancing beam and poise, provided it has sufficient capacity to counterbalance the maximum required load. This results in a more fool-proof weighing device, as mistakes due to errors in the addition of the weights, counterbalanced by several beams, are obviated. The poise 33, which makes it possible to obtain this desirable feature comprises a cylindrical body portion 34 (Figure IX) having a zero indicium 35 and a plurality of vernier indicia 36 engraved in a readily visible position adjacent one of the ends. A screw thread 37 of V-shape is turned on the remaining portion of the cylindrical body (see Figure IX). The openings in the ends of the cylindrical body portion are enclosed by end pieces 38 and 39. These end pieces have flanges 40 and 41 respectively which enter the opening of the body and may be secured in any desired manner. These end pieces are provided with rectangular apertures 42 and 43 adapted to receive the rectangularly shaped graduated portion of the beam 17.

For the purpose of limiting the clearance between the rectangular portion of the beam and the opening 43 in the end piece 39 a screw 44 is adjustably threaded in this end piece. The other end piece 38 has a plunger 45 inserted therein which is urged by a spring 46 into contact with the top of the beam 17 passing through the interior of the body 34. Lying transversely across the lower portion of the opening 42 in the end piece 38 and secured by a screw 47 is a pawl 48, its upwardly turned knife edge being adapted to enter V-notches 49 cut into the bottom edge of the rectangular portion of the beam 17. The apexes of these notches are in registry with indicia 50, representing increments of weight. When the pawl 48 is drawn into one of the V-notches 49 by the spring pressed plunger 45 the poise 33 counterbalances the amount of load on the platform indicated by a value character 50¹ adjacent the indicium registering with the V-notch. Since the spring 46 has sufficient strength to support the weight of the poise, it cannot be shifted along the beam until pressure is exerted upon a finger grip 51 which is fastened by screw 52 to the end piece 38, directly above the spring urged plunger 45.

Substantially midway and in a perpendicular plane passing through the rectangular openings 42 and 43, a bushing 53 is threaded through the wall of the cylindrical body 34, and in an aperture passing through this bushing a plunger 54 is slidably seated. Its length is such that when the bottom end rests on the beam 17 its upper end is substantially flush with the outer surface of the body.

Surrounding the body portion 34 of the poise 33 is an annular sleeve 55 having a tapered end 56 upon which a series of weight graduations 57 are marked. To show the value of each of these graduations designating numerals 58 are stamped or etched on the adjacent shoulder of the sleeve 55. Since the sleeve 55 is intended to move longitudinally on the body 34 when it is turned; to change the center of gravity of the assembled poise, a flat headed screw 59 provided with a chisel pointed insert 59¹ is threaded through the wall of the sleeve in such position that the chisel point 59² of the insert enters the V-groove 37. Thus when the sleeve is rotated on the body, it moves a longitudinal distance which is predetermined by the pitch of the V-groove.

When the zero graduation 57 on the tapered portion 56 is colinear with the zero indicium 35 on the body 34, a hole 60 which extends through the sleeve 55 overlies the pin 54 which is slidably mounted in the bushing 53 and when applying pressure to the finger grip 51, the front end of the poise 33 is depressed as the pin 54 will then enter the hole 60 in the sleeve 55 (see Figure V) and the pawl 48 may be disengaged from the notch 49 in the beam 17 which it had engaged. When, however, the sleeve 55 is moved so that its zero graduation is not coincident with the zero graduation 35 on the body, pressure on the finger grip 51 will not depress the front end of the poise since the hole 60 is no longer overlying the pin 54 and its upper end will contact the inner wall of the sleeve, thus preventing both vertical and longitudinal movement of the poise. This safeguards the entire poise from being accidentally moved along the beam when the zero indicia are not in coincidence.

A manually operated friction clutch is provided to clamp the sleeve and hold it against turning in any position. This means comprises a rectangular opening 61 cut through the sleeve 55 in which a clutch shoe 62 is stationed. One face of the clutch shoe 62 is shaped to conform to the cylindrical body portion 34 and adapted to frictionally engage it. The opposite face is provided with an extending tip 63 which projects into a rectangular slot 64 cut into the inner periphery of a clutch operating ring 65. This ring encircles the sleeve 55 and is held against lateral movement on one side by a shoulder 66 on the sleeve and on the other side by a second ring 67 which encircles the sleeve and is fastened to it by the screws 68 which extend through the ring and are threaded into the sleeve 55.

Since the construction of the poise does not readily lend itself to the removal or addition of metal to adjust its weight, I have provided a heavy portion 75 in the interior of the body having a cored, narrow pocket 76 into which adjusting material, such as lead may be tamped when the poise is light or removed when heavy. The end of the pocket after adjustment of the weight is covered by a plate 77 retained by screws 78.

Accuracy is the prime requisite of a weighing scale and since accuracy is not only dependent upon the design and workmanship of the component parts but also upon the ease and simplicity with which the indication may be observed, I have provided in the embodiment of my invention, a scale beam and a counterbalancing poise which in a simple and efficient manner permits a comparatively large load to be indicated by a large number of widely spaced graduations.

Referring to Figure II, it will be seen that the graduations 50 represent increments of 5-pounds. In the example shown, these five pounds occupy a space of approximately $\frac{9}{16}$ of an inch. If it is desired to obtain the weight as close as ounces, it would be necessary to subdivide these $\frac{9}{16}$ of an inch eighty times which would make the interval for each ounce approximately .007 of an inch. As an engraved or etched line, in order to be visible, must be at least .005 of an inch in width, it can readily be seen that the graduations would appear only as a scarred surface and it would be impossible to distinguish the one co-operating with the poise. In the proposed poise construction, herein described, the unit graduations are marked in the form of a vernier on the body and the revolving sleeve. The smallest diameter of the sleeve is approximately 1½" which is equal to a circumference of 4.7124". This distance is equal in value to the distance occupied by the five pounds on the beam and when it is divided by 80, the number of ounces in five pounds, it results in a distance of approximately .058 of an inch per graduation, and each line is readily distinguishable.

When the load is placed on the platform, the poise being in the zero position on the beam, its pawl 48 engaging the corresponding notch 49, gravity acting on the load overbalances the beam 17, and when the beam is unlocked, by turning the handle 25 to the position as shown in Figure I, the tip end of the beam will move upwardly until the bottom of the opening 26 rests against the latch. To counterbalance the load, the operator places his finger on the trigger 51 of the poise and presses downwardly; since the sleeve 55 is in the zero position, the hole 60 therein overlies the pin 54 and as the pin is resting against the graduated portion of the beam 17, it is pushed upwardly into this hole, the poise being now fulcrumed on the upper edge of the rectangular slot 43. This downward pressure has caused the pawl 48 to become free of the notch and the poise may be moved in the usual manner to a position where it just counterbalances the load. Let us assume that the load weighs 61 pounds and 3 ounces, when the operator has moved the poise outwardly and has reached the 60-pound graduation, he will find that the load is slightly heavier than 60 pounds as shown by the action of the beam, experience, however, tells him that with the poise in registry with the next graduation its counterbalancing moment will be greater than the load. He leaves the poise body, therefore, in its position and turns the sleeve 55 slowly in an anti-clockwise direction. As the sleeve is being turned, the chisel point of the screw 59 fixed therein follows the convolutions of the V-thread 37. This moves the sleeve in the direction of the travel of the poise and changes its center of gravity. When the 1-pound graduation of the series 57 comes opposite the zero indicium 35 on the poise body, the beam is nearly balanced. He, therefore, continues to turn this sleeve very carefully until the 1-pound graduation of the sleeve is opposite the three ounce indicium of the series 36 in the body at which point the beam will be exactly balanced. This enables the operator to determine the weight exactly. The 60-pound indicium on the beam indicates 60 pounds, the indicium on the sleeve indicating 1-pound and the ounces are indicated by the graduation on the poise body. If it is desired to preserve the poise setting, the operator turns the clutch operating ring 65 in a clockwise direction. The projecting tip of the clutch shoe 62 which has heretofore been stationed in the corner of the inner peripheral cut-out 64 is now slightly compressed, when the ring is turned, as the distance from the center of the poise to the flat surface of the peripheral cut-out 64 is slightly less than the distance from the center of the poise to the friction-corner. This forces the clutch shoe to frictionally engage the poise body and this friction is sufficient to prevent the sleeve 55 from turning. Movement of the entire poise is also prevented, as the aperture 60 no longer overlies the beam and pressure on the trigger 51 will be ineffective as the pin 54 rests with its lower end on the beam and the upper end contacts the inner surface of the sleeve 55, thus forming an efficient stop against downward movement of the pawl 48.

It will be seen from the foregoing description that when a beam scale is equipped with the embodiment of my invention herein disclosed only a single beam need be provided to obtain sufficient counterbalancing effect and at the same time indicate the weight in units commensurate with the weighing capacity.

The embodiment of my invention herein shown and described is to be regarded as illustrative only and it is to be understood that the invention is susceptible to variation, modification and change within the spirit and scope of the sub-joined claims.

Having described my invention, I claim:

1. In a device of the class described, in combination, a weighing scale having a cylindrical poise body, a member rotatably and longitudinally movably mounted thereon, an annular member surrounding said movable member and means controlled by said annular member for locking said movable member to said poise body, said locking means including an aperture in said movable member, a clutch shoe stationed within said aperture and having a projecting portion for cooperating with a portion of said annular member, whereby said clutch shoe is firmly pressed against said cylindrical body.

2. In a device of the class described, in combination, a weighing scale having a scale beam, a poise body movably mounted thereon, a sleeve-like member movably mounted on said poise body, means provided on said beam and on said poise for preventing relative longitudinal movement of said poise body and said beam unless said sleeve-like member is in a predetermined position on said poise body.

3. In a device of the class described, in combination, a weighing scale having a scale beam, a poise body movably mounted thereon, a sleeve-like member movably mounted on said poise body, means provided on said beam and on said poise for preventing relative longitudinal movement unless said sleeve-like member is in a predetermined position on said poise body, said movement preventing means including a notch in said beam and a pawl on said poise body adapted to co-operate with each other.

4. In a device of the class described, in combination, a weighing scale having a scale beam, a poise body movably mounted thereon, a sleeve-like member movably mounted on said poise body, means provided on said beam and on said poise for preventing relative longitudinal movement until said sleeve-like member is in a predetermined position on said poise body, said movement preventing means including a notch in said beam and a pawl on said poise body adapted to co-operate with each other, and a pin movably stationed in said poise body for preventing perpendicular motion of a portion of said poise and adapted to be held in locking position by said sleeve-like member.

5. In a device of the class described, in combination, a weighing scale including a beam, a cylindrical load offsetting poise mounted movably on said beam, said poise comprising a hollow cylindrical member, having end pieces, rectangular openings in said end pieces for the reception of said rectangular beam, said rectangular openings being substantially longer than the width of said beam and a screw adjustably threaded in one of said end pieces for limiting the clearance between said rectangular opening and said beam.

FOSTER V. WALTZ.